United States Patent [19]

Leclerc

[11] 4,253,678

[45] Mar. 3, 1981

[54] INVALID WALKER

[76] Inventor: Stanislas Leclerc, 625 Rouleau St., Apt. 3, St. Hyacinthe, Quebec, Canada, J2S 1B6

[21] Appl. No.: 97,562

[22] Filed: Nov. 26, 1979

[51] Int. Cl.[3] .................... B62B 7/08

[52] U.S. Cl. .................... 280/42; 297/6

[58] Field of Search .................... 280/42, 87.02 W; 297/6, 297/5, 60; 135/67

[56] References Cited

U.S. PATENT DOCUMENTS

| | | | |
|---|---|---|---|
| 2,129,260 | 9/1938 | Bowser | 297/6 |
| 2,369,040 | 2/1945 | Grady | 280/219 |
| 2,733,754 | 2/1956 | Leslie | 297/6 |
| 2,734,554 | 2/1956 | Ries | 135/67 |
| 2,866,495 | 12/1958 | Diehl | 297/6 |
| 3,232,251 | 2/1966 | Hughes | 297/6 |
| 4,046,374 | 9/1977 | Breyley | 272/70.3 |

FOREIGN PATENT DOCUMENTS

| | | |
|---|---|---|
| 210961 | 4/1921 | Canada . |
| 213958 | 10/1921 | Canada . |
| 361042 | 10/1936 | Canada . |
| 432983 | 2/1940 | Canada . |
| 885241 | 11/1971 | Canada . |

*Primary Examiner*—Robert R. Song

[57] ABSTRACT

An invalid walker is disclosed. The walker comprises a pair of side frames each including two vertical legs joined by transverse members, an X-shaped frame comprising two cross-members pivotally connected to each other and joining the side frames at the front of the walker, with the upper ends of the cross-members being pivotally mounted on the upper ends of the legs and the lower ends of said cross-members being slidably mounted on the lower ends of the legs for permitting folding of the walker, a removable seat assembly which may be mounted on the side frames at the rear of the walker after entrance of the invalid into the walker, and means at the side frames at the front of the walker for maintaining the side frames apart during use.

1 Claim, 5 Drawing Figures

INVALID WALKER

This invention relates to an invalid walker.

Various types of invalid walkers, including foldable ones, are known, but their construction is generally complicated and the installation of useful accessories, such as seats and tables, is time-consuming.

It is therefore the object of the present invention to provide a foldable invalid walker with removable accessories, which can be easily installed after entrance of the invalid into the walker.

The invalid walker, in accordance with the invention, comprises a pair of side frames each including two vertical legs joined by transverse members, an X-shaped frame comprising two cross-members pivotally connected to each other and joining the two side frames at the front of the walker, with the upper ends of said cross-members being pivotally mounted on the upper ends of the legs and the lower ends of said cross-members being slidably mounted on the lower ends of the legs for permitting folding of the walker, a removable seat assembly which may be mounted on the side frames at the rear of the walker after entrance of the invalid into the walker, and means for bridging the side frames at the front of the walker for maintaining the said frames apart during use.

The lower end of each front leg is preferably formed of two spaced leg members and the lower ends of the cross-members are provided with a pin, which can slide between the two spaced leg members.

The removable seat assembly preferably comprises a back mounted on the vertical legs between two transverse members joining the legs of each side frame, and a seat mounted on the lower transverse members. A removable table may also be mounted on the upper transverse members.

Casters are mounted at the lower end of the legs. The front casters are preferably fixed, whereas the back ones are preferably swivel casters.

A brake assembly is mounted on the walker for maintaining the walker in a position when needed. The suitable brake assembly comprises a vertical rod slidably mounted on the transverse members of a side frame, a spring for biasing the rod in contact with the ground, and means for locking the rod out of contact with the ground when the invalid desires to move with the walker.

The invention will now be disclosed by way of example, with reference to the accompanying drawings, in which.

Figure 1:
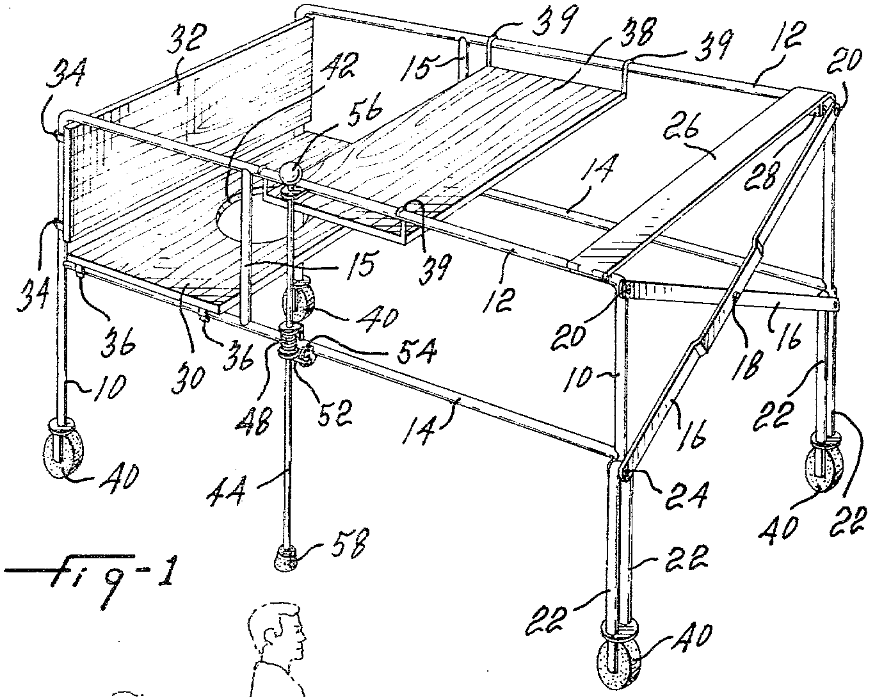
FIG. 1 illustrates a perspective view of an invalid walker in accordance with the invention.
Figure 2:
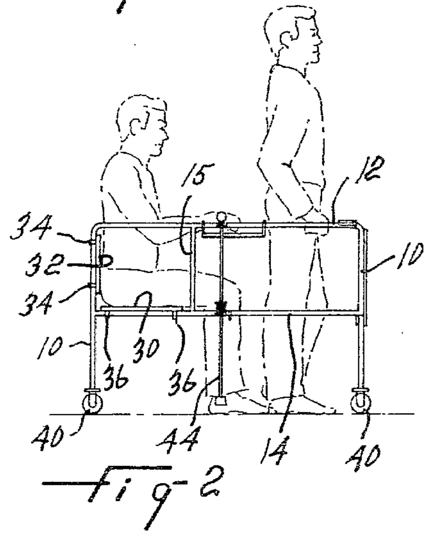
FIG. 2 illustrates a side view of the walker of FIG. 1 showing an invalid person in the seated position and also in the standing position.
Figure 4:
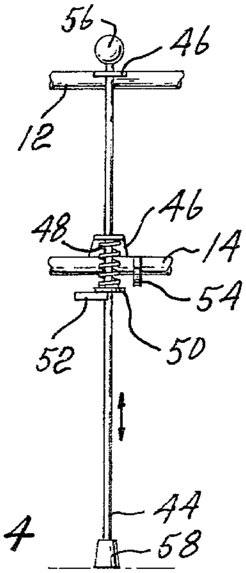
FIG. 4 illustrates an enlarged view of the brake assembly shown in FIG. 1.
Figure 3:
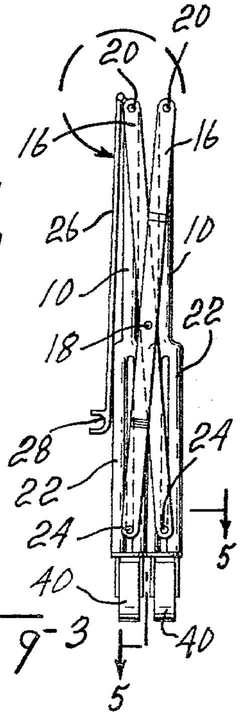
FIG. 3 illustrates the walker in accordance with the invention in the folded position.
Figure 5:
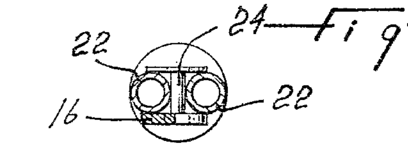
FIG. 5 illustrates a view taken along line 5—5 of FIG. 3.

Referring to the drawings, there is shown an invalid walker comprising a pair of side frames, each including two vertical legs 10 joined by two spaced transverse members 12 and 14. The transverse members are themselves joined by a cross-member 15. The front legs of the two side frames are joined by an X-frame, made of two cross-members 16 pivotally connected to each other at 18. The upper ends of the two cross-members are pivotally mounted on the legs of the side frames at 20. The lower end of each front leg is formed of two spaced leg members 22 and the lower ends of the cross-members 16 are provided with a pin 24, which can slide between the two leg members, as shown in FIG. 5, for allowing folding of the two side frames against each other, as shown in FIG. 3.

The walker is maintained in the open position by a locking member 26, which is hinged on one end on the top transverse member 12 of one side frame, and provided with a catch 28 at its other end to engage the top transverse member 12 of the other side frame.

Once the invalid person has entered into the walker from the open back, a seat assembly, including a seat 30 and a back 32, may be installed on the walker for the convenience of the invalid person. The back is provided with four C-shaped clips 34 which engage the back legs 10 between the two transverse members 12 and 14. The seat is also provided with four C-shaped clips 36 engaging the transverse members 14 of each side frame. A table 38 may also be mounted on the top transverse member 12 of each side frame by means of hooks 39 for eating, playing cards, etc.

Casters 40 are mounted on the lower end of the legs 10. The front legs are normally provided with fixed casters and the back legs with swivel casters to permit easy manoeuvering of the walker.

The seat 30 may be provided with a hole 42 for sanitary use. The walker can be easily rolled up over a regular toilet bowl by the invalid person himself due to the use of swivel casters on the back legs. Another seat 30, without hole 42, (not shown) can also be provided.

The walker is also provided with a brake assembly including a vertical rod 44 slidably mounted in brackets 46 secured to transverse members 12 and 14 of one of the side frames. The rod is biased to contact with the ground by means of a compression spring 48 inserted between bracket 46 and a stop ring 50 secured to the rod 44. Said stop ring includes a finger 52 which can be moved into engagement with a catcher 54 mounted on the transverse member 14 by rotation of the rod 44 for locking the rod out of contact with the ground when the invalid person desires to move with the walker. Rod 44 is provided with a handle 56 for easy operation of the brake assembly and with a rubber pad 58 for frictionally engaging the floor.

The structural members of the above-disclosed walker are made of metal, preferably chromium-plated aluminum, to make the walker as light as possible. Rod 44 is preferably made of chromium-plated steel to resist bending. Rod 44, in raised locked position, is about 1" above the floor to clear door sills.

Although the invention has been disclosed with reference to a preferred embodiment, it is to be understood that the invention is not limited to such embodiment and that other alternatives are also envisaged within the scope of the following claims.

I claim:

1. An invalid walker comprising:
   - (a) a pair of side frames each including two vertical legs joined by transverse members;
   - (b) an X-shaped frame comprising two cross-members pivotally connected to each other and joining the two side frames at the front of the walker, with the upper ends of said cross-members being pivotally mounted on the upper ends of the legs and the lower ends of said cross-members being slidably mounted on the lower ends of the legs for permitting folding of the walker;

(c) a removable seat assembly which may be mounted on the side frames at the rear of the walker after entrance of the invalid person into the walker;

(d) means for bridging the side frames at the front of the walker for maintaining the side frames apart during use and (e) wherein the lower end of each front leg is formed of two spaced leg members, and the lower ends of the cross-members are provided with a pin which can slide between the two leg members.

* * * * *